United States Patent
Mueller-Cristadoro et al.

(10) Patent No.: US 9,598,548 B2
(45) Date of Patent: Mar. 21, 2017

(54) PRODUCING POLYMER FOAMS COMPRISING IMIDE GROUPS

(71) Applicant: BASF SE, Ludwigshafen (DE)

(72) Inventors: Anna Mueller-Cristadoro, Waldems (DE); Frank Prissok, Lemfoerde (DE)

(73) Assignee: BASF SE, Ludwigshafen (DE)

( * ) Notice: Subject to any disclaimer, the term of this patent is extended or adjusted under 35 U.S.C. 154(b) by 431 days.

(21) Appl. No.: 13/961,246

(22) Filed: Aug. 7, 2013

(65) Prior Publication Data
US 2014/0042356 A1 Feb. 13, 2014

Related U.S. Application Data

(60) Provisional application No. 61/681,147, filed on Aug. 9, 2012.

(51) Int. Cl.
*C08J 9/08* (2006.01)
*C08J 9/00* (2006.01)
*C08G 18/48* (2006.01)
*C08G 18/80* (2006.01)
*C08G 18/34* (2006.01)
*C08G 101/00* (2006.01)

(52) U.S. Cl.
CPC .......... *C08J 9/0061* (2013.01); *C08G 18/341* (2013.01); *C08G 18/346* (2013.01); *C08G 18/4825* (2013.01); *C08G 18/8048* (2013.01); C08G 2101/005 (2013.01)

(58) Field of Classification Search
CPC C08G 18/341; C08G 18/346; C08G 18/4825; C08G 18/8048; C08G 18/1825; C08G 18/1833; C08G 18/1858; C08G 18/2027; C08G 18/3206; C08G 2101/005; C08G 2101/0025; C08J 9/0061
See application file for complete search history.

(56) References Cited

U.S. PATENT DOCUMENTS

| | | | |
|---|---|---|---|
| 2,155,687 A | 4/1939 | Schauer | |
| 3,277,117 A | 10/1966 | Van Strien et al. | |
| 3,562,189 A | 2/1971 | Farrissey, Jr. et al. | |
| 3,772,216 A | 11/1973 | Rosser | |
| 3,813,355 A | 5/1974 | Allen | |
| 4,184,021 A | 1/1980 | Frosch et al. | |
| 5,162,385 A * | 11/1992 | Hartwig | C08G 18/092 521/118 |
| 5,527,876 A | 6/1996 | Kluth et al. | |
| 6,403,665 B1 * | 6/2002 | Sieker | C08G 18/089 252/182.24 |
| 2006/0030633 A1 * | 2/2006 | Keske | C08G 18/089 521/99 |
| 2006/0063848 A1 | 3/2006 | Vazquez et al. | |
| 2012/0142801 A1 | 6/2012 | Prissok et al. | |
| 2014/0042356 A1 | 2/2014 | Mueller-Cristadoro et al. | |

FOREIGN PATENT DOCUMENTS

| | | |
|---|---|---|
| DE | 42 02 758 A1 | 8/1993 |
| DE | 43 25 014 A1 | 2/1995 |
| DE | 198 04 911 A1 | 8/1999 |
| DE | 101 56 129 A1 | 5/2003 |
| EP | 0 527 613 A2 | 2/1993 |
| GB | 1137263 | 12/1968 |
| JP | 2006-137870 | 6/2006 |
| WO | WO 2011/147723 A1 | 12/2011 |
| WO | WO 2012/098145 A1 | 7/2012 |
| WO | WO 2014/006182 A1 | 1/2014 |

OTHER PUBLICATIONS

U.S. Appl. No. 13/884,135, filed May 8, 2013, Frank Prissok, et al.
U.S. Appl. No. 13/772,971, filed Feb. 21, 2013, Frank Prissok, et al.
Anne C. Schuemacher, et al., "Condensation Between Isocyanates and Carboxylic Acids in the Presence of 4-Dimethylaminopyndine (DMAP), a Mild and Efficient Synthesis of Amides", Synthesis 2001, No. 2, 4 pages.
Ian S. Blagbrough, et al., "The Condensation Reaction Between Isocyanates and Carboxylic Acids. A Practical Synthesis of Substituted Amides and Anilides", Tetrahedron Letters, vol. 27, No. 11, 1986, 4 pages.
International Search Report and Written Opinion issued Dec. 10, 2013 in Application No. PCT/EP2013/066617 (With English Translation of Category of Cited Documents).
Augustin T. Chen, et al., "New High-Temperature Thermoplastic Elastomers", Rubber Chemistry and Technology, vol. 59, 1986, pp. 615-622.

(Continued)

*Primary Examiner* — John Cooney
(74) *Attorney, Agent, or Firm* — Oblon, McClelland, Maier & Neustadt, L.L.P.

(57) ABSTRACT

A process for producing a polymer foam comprises reacting components A to C in the presence of component D and optionally E or an isocyanate-functional prepolymer of components A and B with component C in the presence of component D and optionally component E, the total amount of which is 100 wt %, (A) 35 to 65 wt % of at least one polyisocyanate component A, wherein 10 to 100 wt % of component A is a condensation product comprising polyimide groups and resulting from condensing at least one polyisocyanate component with at least one polycarboxylic acid having at least 3 COOH groups per molecule or its anhydride, (B) 5 to 50 wt % of at least one polyol component B, (C) 1 to 59 wt % of at least one polycarboxylic acid component C, and (D) 0.01 to 3 wt % of at least one Lewis base component D, (E) 0 to 5 wt % of at least one foam stabilizer component E, wherein the reaction takes place with release of carbon dioxide.

9 Claims, No Drawings

(56) References Cited

OTHER PUBLICATIONS

Han Mo Jeong, et al., "Phase structure and properties of some thermoplastic polyesteramide elastomers", Polymer, vol. 39, No. 2, 1998, pp. 459-465.
U.S. Appl. No. 14/104,135, filed Dec. 12, 2013, Cristadoro, et al.

* cited by examiner

PRODUCING POLYMER FOAMS COMPRISING IMIDE GROUPS

The present invention relates to a process for producing a polymer foam comprising imide groups, to the polymer foam thus obtainable, to the use in its production of polyisocyanates comprising imide groups and to its use.

Polymer foams, such as polyurethane and polyurethane-polyurea foams based on di- or polyisocyanates are well known. Rigid polyurethane phases have a distinctly lower melting temperature compared with a rigid polyamide phase which has a decisive influence on using the materials at high temperatures.

It is further known to react carboxylic acids with isocyanates to form mixed carbamic anhydrides with partial further reaction to form amides. The reaction and the reaction mechanism are described for example by R. W. Hoffman in Synthesis 2001, No. 2, 243-246 and I. Scott in Tetrahedron Letters, Vol. 27, No. 11, pp 1251-1254, 1986.

Oligomeric compounds that use a reaction between a diisocyanate and a dicarboxylic acid are described by K. Onder in Rubber Chemistry and Technology, Vol. 59, pages 615-622 and by T. O. Ahn in Polymer Vol. 39, No. 2, pp. 459-456, 1998.

EP 0 527 613 A2 describes the production of foams comprising amide groups. These are produced using organic polyisocyanates and polyfunctional organic acids. The foams are produced using an addition reaction by reacting an organic polyisocyanate with the reaction product of a polyoxyalkylene and of an organic polycarboxylic acid component. The two isocyanate groups react with a compound which generates carbon dioxide. This compound is the reaction product of a polyoxyalkylene polyamine or of a polyol component with an organic polycarboxylic acid component. The polyoxyalkylene polyamine or polyol component has an average molecular weight of 200 to 5000 g/mol. The starting temperature for the reaction is at least 150° C., while the reaction time is in a range from half an hour to twelve hours.

DE 42 02 758 A1 describes a foam comprising urethane and amide groups which is obtainable by using polyhydroxycarboxylic acids having a chain length of 8 to 200 carbon atoms. These polyhydroxycarboxylic acids are conveniently produced by ring-opening epoxidized unsaturated fatty acids with hydroxyl-containing compounds, such as water, alcohol or hydroxycarboxylic acids. Foam densities range from 33 to 190 kg/m$^3$.

JP 2006-137870 A describes a process for producing a polyamide foam and the use of this polyamide foam. A polyisocyanate component and a polyester polycarboxylic acid component are made to react with each other using a phosphine oxide as catalyst. The reaction mixture is heated to 170° C. at least.

The known polyurethane-polyamide foams are disadvantageous because the starting materials either only react at comparatively high temperatures or do not react to completion, and their density is not in line with standard polyurethane recipes.

Prior European patent application 12 161 392.1, filed Mar. 27, 2012, unpublished at the priority date of the present invention, bears the title "Producing rigid polymer foams" and describes a process for producing a polymer foam wherein at least one polyisocyanate component, at least one polyol component and at least one polycarboxylic acid component are reacted in the presence of a Lewis base component as catalyst.

WO 2011/147723 describes construction materials comprising at least one rubber and at least one polyimide, wherein the polyimide is a branched condensation product of at least one polyisocyanate having on average more than two isocyanate groups per molecule and at least one polycarboxylic acid having at least three carboxyl groups per molecule or its anhydride. The polyimide is used to improve the attachment of polyurethanes to rubbers.

The present invention has for its object to provide polymer foams that are dimensionally stable even at high temperatures in the presence of moisture and/or at high pressures, so that they can even be used in the engine, transmission or exhaust environment, and their methods of making. The polymer foams shall further have advantageous properties with respect to sustained elasticity, abrasion resistance, tensile strength, tongue tear strength and compressive stresses. The present invention further has for its object to provide a polymer foam comprising polyamide groups obtainable by reaction of diisocyanate components with dicarboxylic acid components within a short time and preferably without the need for additional blowing agents.

In relation to EP 12 161 392.1, the present invention further has for its object to improve the thermal stability of polymer foams.

These objects are achieved, in accordance with the present invention, by a process for producing a polymer foam comprising reacting components A to C in the presence of component D and optionally E or an isocyanate-functional prepolymer of components A and B with component C in the presence of component D and optionally component E, the total amount of which is 100 wt %, (A) 35 to 65 wt % of at least one polyisocyanate component A, wherein 10 to 100 wt % of component A is a condensation product comprising polyimide groups and resulting from condensing at least one polyisocyanate component with at least one polycarboxylic acid having at least 3 COOH groups per molecule or its anhydride, (B) 5 to 50 wt % of at least one polyol component B, (C) 1 to 59 wt % of at least one polycarboxylic acid component C, and (D) 0.01 to 3 wt % of at least one Lewis base component D, (E) 0 to 5 wt % of at least one foam stabilizer component E, wherein the reaction takes place with release of carbon dioxide. Further ingredients may be included in the reaction mixture in addition to components A to D and optionally E.

The process of the present invention involves the reaction of a carboxylic acid group with an isocyanate group to form a mixed carbamic anhydride which reacts further to form an amide. $CO_2$ elimination from the carbamic anhydrides using Lewis bases as catalysts provides the polymer foams at a similar rate to, for example, polymer foams based on polyurethane. Since this reaction releases the blowing gas from the components themselves, it can be carried out in the virtual or complete absence of water and blowing agent.

The polymer foam may have different properties. It may be a rigid foam or a flexible foam for example. The polymer foam may preferably be a rigid polymer foam.

A rigid polymer foam can be understood as meaning in the context of the present invention that, in the course of the production of the rigid polymer foam, the reaction mixture undergoes a volume change until the reaction has finally ended, even after the main reaction has ended, since the foam matrix is still viscous and the gas can continue to expand within the foam. It is advantageously possible for the polymer foam to include cells/cavities within the polymer foam and also on the surface of the polymer foam.

The rigid polymer foams of the present invention may preferably have a compressive stress at 10% relative deformation of not less than 80 kPa, more preferably not less than 150 kPa and even more preferably not less than 180 kPa. The rigid polymer foam further may preferably have a DIN ISO 4590 closed-cell content of not less than 70% and preferably above 85%. Further details concerning preferred rigid polymer foams of the present invention appear in "Kunststoffhandbuch, Vol. 7, Polyurethane", Carl Hanser Verlag, 3rd edition 1993, chapter 6. DIN 7726 can also be referenced for polyurethane foams.

The present invention utilizes the Lewis base component as an accelerant or catalyst in the reaction, making it possible for the polyaddition and the polycondensation to be carried out uniformly and at a high rate to ensure that not only the molecular weight buildup and the gelling of the resulting polymer but also the expansive foaming, especially due to the released carbon dioxide, take place simultaneously so as to form a stable uniform foam which then solidifies. The inventors found that the use of one Lewis base component for both the elementary reactions is sufficient and that the reactions coordinate with each other such that gas production and foam formation are simultaneously accompanied by a viscosity increase which leads to a uniform foam being produced. Once the viscosity has increased too much, foam formation can be impaired. If, during foam formation, the viscosity increase is insufficient and/or no gelling whatsoever has ensued, the produced gas is able to rise through the liquid polymer and escape therefrom and/or accumulate at the surface, preventing the formation of a uniform foam structure. These problems are overcome in the process of the present invention, resulting in a polymer foam having a uniform cellular distribution throughout the entire cross section of the polymer foam.

The present inventors further found that when the components are used in the amounts of the present invention, carbon dioxide formation is sufficient to produce a suitable polymer foam, eliminating the need to add external blowing agents. When a foam of lower density is desired, however, external blowing agents can also be additionally used. It is preferable to dispense with the addition of external blowing agents. Similarly, in accordance with the present invention, any addition of water to the reaction mixture or the presence of water in the reaction mixture is avoided. The reaction is preferably carried out largely or completely waterlessly, i.e., in the absence of water. There is preferably no water in the reaction mixture.

The use of a condensation product comprising polyimide groups and resulting from condensing at least one polyisocyanate component with at least one polycarboxylic acid having at least three carboxyl groups per molecule or its anhydride to wholly or partly replace the polyisocyanate component A provides a further improvement in the thermal stability of the foams which are formed.

The individual components used according to the present invention will now be more particularly elucidated.

Polyisocyanate component A as used according to the present invention comprises from 10 to 100 wt %, preferably from 50 to 100 wt % and especially from 70 to 100 wt % of a condensation production comprising polyimide groups and resulting from condensing at least one polyisocyanate component with at least one polycarboxylic acid having at least three carboxyl groups per molecule or its anhydride as component A2 as well as from 0 to 90 wt %, preferably from 0 to 50 wt % and especially from 0 to 30 wt % of a polyisocyanate component A1 comprising no polyimide groups.

Said polyisocyanate component A2 is derivable by reacting the polyisocyanate component A1 with at least one carboxylic acid having at least three carboxyl groups per molecule or its anhydride. Therefore, said polyisocyanate component A1 is described before its reaction with polycarboxylic acids to form said polyisocyanate component A2 comprising polyimide groups is described.

For the purposes of the present invention, at least one polyisocyanate component, herein also referred to as component A1, comprises polyfunctional aromatic and/or aliphatic isocyanates, for example diisocyanates.

It may be advantageous for the polyisocyanate component A1 to have an isocyanate group functionality in the range from 1.8 to 5.0, more preferably in the range from 1.9 to 3.5 and most preferably in the range from 2.0 to 3.0.

It is preferable for the suitable polyfunctional isocyanates to comprise on average from 2 to not more than 4 NCO groups. Examples of suitable isocyanates are 1,5-naphthylene diisocyanate, xylylene diisocyanate (XDI), tetramethylxylylene diisocyanate (TMXDI), diphenyldimethylmethane diisocyanate derivatives, di- and tetraalkyldiphenylmethane diisocyanate, 4,4-dibenzyl diisocyanate, 1,3-phenylene diisocyanate, 1,4-phenylene diisocyanate, the isomers of tolylene diisocyanate (TDI), optionally in admixture, 1-methyl-2,4-diisocyanatocyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), chlorinated and brominated diisocyanates, phosphorus-containing diisocyanates, 4,4-diisocyanatophenylperfluoroethane, tetramethoxybutane 1,4-diisocyanate, butane-1,4-diisocyanate, hexane 1,6-diisocyanate (HDI), dicyclohexylmethane diisocyanate, cyclohexane 1,4-diisocyanate, ethylene diisocyanate, bisisocyanatoethyl phthalate, also polyisocyanates with reactive halogen atoms, such as 1-chloromethylphenyl 2,4-diisocyanate, 1-bromomethylphenyl 2,6-diisocyanate, 3,3-bischloromethyl ether 4,4 min-diphenyl diisocyanate.

Further important diisocyanates are trimethylhexamethylene diisocyanate, 1,4-diisocyanato-butane, 1,12-diisocyanatododecane and dimer fatty acid diisocyanate.

4,4-Diphenylmethane diisocyanate (MDI), hydrogenated MDI ($H_{12}$MDI) and polymeric methylene diphenyl diisocyanate are particularly suitable and the polymeric methylene diphenyl diisocyanate advantageously has a functionality of not less than 2.2.

In a further embodiment of the process according to the present invention, component A1 has an average molecular weight in the range from 100 g/mol to 750 g/mol, advantageously in the range from 130 g/mol to 500 g/mol and especially in the range from 250 g/mol to 450 g/mol.

To prepare polyisocyanate component A2, said polyisocyanate component A1 may be subjected to a further condensation reaction with at least one polycarboxylic acid having at least three carboxyl groups per molecule or its anhydride to form a condensation product comprising polyimide groups. The polycarboxylic acid used for this is also referred to component A2b, while the employed polyisocyanate component A2a may correspond to said polyisocyanate component A1.

Polycarboxylic acids A2b are selected from aliphatic or preferably aromatic polycarboxylic acids having at least three COOH groups per molecule, or the corresponding anhydrides, preferably if they are in low molecular weight form, i.e., in non-polymeric form. Polycarboxylic acids having three COOH groups where two carboxylic acid groups are present as an anhydride and the third is present as a free carboxylic acid are also comprehended.

In a preferred embodiment of the present invention, a polycarboxylic acid having at least 4 COOH groups per molecule, or the corresponding anhydride, is selected as polycarboxylic acid A2b.

Examples of polycarboxylic acids A2b and anhydrides thereof are 1,2,3-benzenetricarboxylic acid and 1,2,3-benzenetricarboxylic dianhydride, 1,3,5-benzenetricarboxylic acid (trimesic acid), preferably 1,2,4-benzenetricarboxylic acid (trimellitic acid), trimellitic anhydride and especially 1,2,4,5-benzenetetracarboxylic acid (pyromellitic acid) and 1,2,4,5-benzenetetracarboxylic dianhydride (pyromellitic dianhydride), 3,3',4,4"-benzophenonetetracarboxylic acid, 3,3',4,4"-benzophenonetetracarboxylic dianhydride, also benzenehexacarboxylic acid (mellitic acid) and anhydrides of mellitic acid.

Useful polycarboxylic acids and anhydrides further include mellophanic acid and mellophanic anhydride, 1,2,3,4-benzenetetracarboxylic acid and 1,2,3,4-benzenetetracarboxylic dianhydride, 3,3,4,4-biphenyltetracarboxylic acid and 3,3,4,4-biphenyltetracarboxylic dianhydride, 2,2,3,3-biphenyltetracarboxylic acid and 2,2,3,3-biphenyltetracarboxylic dianhydride, 1,4,5,8-naphthalenetetracarboxylic acid and 1,4,5,8-naphthalenetetracarboxylic dianhydride, 1,2,4,5-naphthalenetetracarboxylic acid and 1,2,4,5-naphthalenetetracarboxylic dianhydride, 2,3,6,7-naphthalenetetracarboxylic acid and 2,3,6,7-naphthalenetetracarboxylic dianhydride, 1,4,5,8-decahydronaphthalenetetracarboxylic acid and 1,4,5,8-decahydronaphthalene-tetracarboxylic dianhydride, 4,8-dimethyl-1,2,3,5,6,7-hexahydronaphthalene-1,2,5,6-tetra-carboxylic acid and 4,8-dimethyl-1,2,3,5,6,7-hexahydronaphthalene-1,2,5,6-tetracarboxylic dianhydride, 2,6-dichloronaphthalene-1,4,5,8-tetracarboxylic acid and 2,6-dichloronaphthalene-1,4,5,8-tetracarboxylic dianhydride, 2,7-dichloronaphthalene-1,4,5,8-tetracarboxylic acid and 2,7-dichloronaphthalene-1,4,5,8-tetracarboxylic dianhydride, 2,3,6,7-tetrachloronaphthalene-1,4,5,8-tetracarboxylic acid and 2,3,6,7-tetrachloronaphthalene-1,4,5,8-tetracarboxylic dianhydride, 1,3,9,10-phenanethrenetetracarboxylic acid and 1,3,9,10-phenanthrene-tetracarboxylic dianhydride, 3,4,9,10-perylenetetracarboxylic acid and 3,4,9,10-perylene-tetracarboxylic dianhydride, bis(2,3-dicarboxyphenyl)methane and bis(2,3-dicarboxy-phenyl)methane dianhydride, bis(3,4-dicarboxyphenyl)methane and bis(2,3-dicarboxy-phenyl)methane dianhydride, bis(3,4-dicarboxyphenyl)methane and bis(3,4-dicarboxy-phenyl)methane dianhydride, 1,1-bis(2,3-dicarboxyphenyl)methane and 1,1-bis(2,3-dicarboxy-phenyl)ethane dianhydride, 1,1-bis(3,4-dicarboxyphenyl)ethane and 1,1-bis(3,4-dicarboxy-phenyl)ethane dianhydride, 1,1-bis(3,4-dicarboxyphenyl)ethane and 1,1-bis(3,4-dicarboxy-phenyl)ethane dianhydride, 2,2-bis(2,3-dicarboxyphenyl)propane and 2,2-bis(2,3-dicarboxy-phenyl)propane dianhydride, 2,3-bis(3,4-dicarboxyphenyl)propane and 2,3-bis(3,4-dicarboxy-phenyl)propane dianhydride, bis(3,4-carboxyphenyl)sulfone and bis(3,4-carboxyphenyl)sulfone dianhydride, bis(3,4-carboxyphenyl)ether and bis(3,4-carboxyphenyl)ether dianhydride, ethylenetetracarboxylic acid and ethylenetetracarboxylic dianhydride, 1,2,3,4-butane-tetracarboxylic acid and 1,2,3,4-butanetetracarboxylic dianhydride, 1,2,3,4-cyclopentane-tetracarboxylic acid and 1,2,3,4-cyclopentanetetracarboxylic dianhydride, 2,3,4,5-pyrrolidinetetracarboxylic acid and 2,3,4,5-pyrrolidinetetracarboxylic dianhydride, 2,3,5,6-pyrazinetetracarboxylic acid and 2,3,5,6-pyrazinetetracarboxylic dianhydride, 2,3,4,5-thiophenetetracarboxylic acid and 2,3,4,5-thiophenetetracarboxylic dianhydride.

It is preferable according to the present invention to use pyromellitic acid or its anhydride.

In one embodiment of the present invention, anhydrides from U.S. Pat. No. 2,155,687 or U.S. Pat. No. 3,277,117 are used to synthesize component A2.

When polyisocyanate A2a and polycarboxylic acid A2b are condensed with each other, which is preferably done in the presence of a catalyst, an imide group is formed by elimination of $CO_2$ and $H_2O$. When the anhydride of polycarboxylic acid A2b is used instead, an imide group is formed by elimination of $CO_2$.

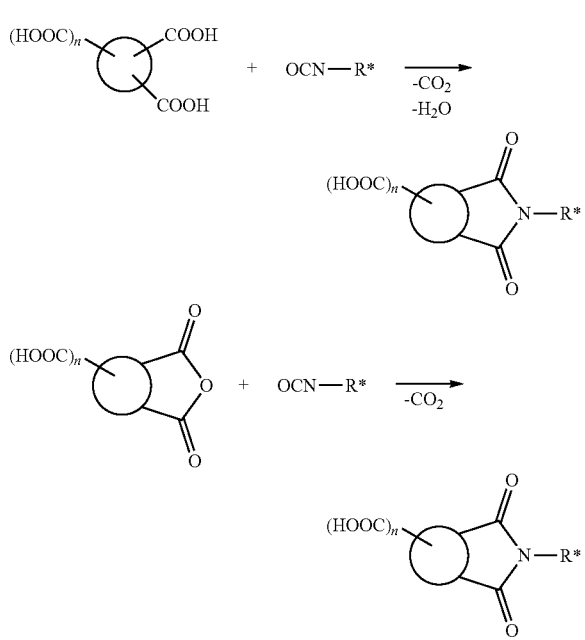

In these reaction equations, the R* moiety of polyisocyanate A2a does not have to be further specified and n is not less than 1, for example 1 in the case of a tricarboxylic acid or 2 in the case of a tetracarboxylic acid, while $(HOOC)_n$ can be replaced by an anhydride group of the formula $C(=O)—O—C(=O)$.

One embodiment of the present invention utilizes polyisocyanate A2a in admixture with at least one diisocyanate, for example with tolylene diisocyanate, hexamethylene diisocyanate or with isophorone diisocyanate. One particular version utilizes polyisocyanate A2a in a mixture with the corresponding diisocyanate, for example trimeric HDI with hexamethylene diisocyanate or trimeric isophorone diisocyanate with isophorone diisocyanate or polymeric diphenylmethane diisocyanate (polymer MDI) with diphenylmethane diisocyanate.

One embodiment of the present invention utilizes polycarboxylic acid A2b in admixture with at least one dicarboxylic acid or with at least one dicarboxylic anhydride, for example with phthalic acid or phthalic anhydride.

Components A2a and A2b are preferably used in a weight ratio ranging from 20:1 to 1:1, more preferably from 10:1 to 2:1 and especially from 7:1 to 3:1.

The synthesis (which does form part of the subject matter of the present invention) may preferably be carried out by using polyisocyanate (A2a) and polycarboxylic acid (A2b) or anhydride (A2b) in a mixing ratio such that the molar fraction of NCO groups relative to COOH groups is in the range from 1:3 to 3:1 and preferably in the range from 1:2 to 2:1. One anhydride group of the formula CO—O—CO here counts as two COOH groups.

Component A2 preferably has a molecular weight $M_W$ in the range from 1000 to 200 000 g/mol.

Component A2 preferably has at least two imide groups per molecule and more preferably at least three imide group per Molecule.

Component A2 may be composed of structurally and molecularly uniform molecules or comprise a mixture of molecular-structurally different molecules. For example, the polydispersity $M_W/M_n$ may be not less than 1.4, for example in the range from 1.4 to 50 and preferably in the range from 1.5 to 10. Polydispersity can be determined by known methods, especially by gel permeation chromatography (GPC). Polymethyl methacrylate (PMMA) for example is a suitable standard for this.

Component A2 may in addition to the imide groups in the polymer scaffolding comprise end- or side-disposed functional groups, which may be anhydride or acid groups as well as free or blocked NCO groups.

This polyisocyanate component can ideally provide a high density of amide bonds per polymer unit which is produced in the process of the present invention. This makes it possible to generate a rigid phase having advantageous properties. Amides have higher melting points and higher decomposition temperatures than urethanes. Rigid polymer foams having a higher proportion of amide bonds therefore likewise have a higher melting point and a higher decomposition temperature and hence are particularly suitable for high-temperature applications, for example as insulating material in the engine compartment of a motor vehicle. The presence of amide bonds provides for a still further improvement in the thermal stability. Component A2 preferably has a number-average molecular weight in the range from 1000 to 10 000 g/mol and more preferably in the range from 2000 to 5000 g/mol.

The process of the present invention involves the reaction of 35-75 wt % of at least one polyisocyanate component A, preferably of 40-70 wt % of at least one polyisocyanate component A and more preferably of 50-65 wt % of at least one polyisocyanate component A. More particularly, component A can be contacted with the particular components B, C and D and optionally E together, in succession or with each one first. For example, components A and B can be reacted to produce an isocyanate-functional prepolymer. This prepolymer in turn has an isocyanate functionality of preferably 2.5 to 3.

For the purposes of the present invention, at least one polyol component B, herein also referred to as component B, comprises organic compounds having two or more free hydroxyl groups. These compounds are preferably free of other functional groups or reactive groups, such as acid groups. Preferably, polyol component B is a polyether polyol or a polyester polyol.

Examples thereof are a polyoxyalkylene, a polyoxyalkenyl, a polyester diol, a polyesterol, a polyether glycol, especially a polypropylene glycol, a polyethylene glycol, a polypropylene glycol, a polypropylene ethylene glycol, or mixtures thereof. A mixture can be understood as meaning for example a copolymer, but also a mixture of polymers. The polyglycol component preferably has an average molecular weight in the range from 200 g/mol to 6000 g/mol, especially in the range from 250 g/mol to 3000 g/mol and more preferably in the range from 300 g/mol to 800 g/mol.

In a further embodiment of the process according to the present invention, component B has an OH number of 10 mg KOH/g to 1000 mg KOH/g. More particularly, component B can have an OH number of 30 mg KOH/g to 500 mg KOH/g.

Components A and (B+C) may be used in a molar ratio of isocyanate groups on component A to isocyanate-reactive groups, such as hydroxyl or carboxylic acid groups on components B and C in the range of preferably 10:1 to 1:2, more preferably from 5:1 to 1:1.5 and especially from 3:1 to 1:1.

The proportion of component B in the reaction mixtures may preferably be in the range from 10 to 30 wt % and especially in the range from 15 to 20 wt %.

For the purposes of the present invention, at least one polycarboxylic acid compound, preferably dicarboxylic acid component, herein also referred to as component C, comprises an organic compound having at least or exactly two carboxyl groups, —COOH, or an acid anhydride thereof. The carboxyl groups can be bonded to alkyl or cycloalkyl moieties or to aromatic moieties. Aliphatic, aromatic, araliphatic or alkylaromatic polycarboxylic acids may be concerned, which may also contain heteroatoms, especially nitrogen atoms and other functional groups, e.g., hydroxyl groups or keto groups. The poly- or dicarboxylic acid component can be used in the processes of the present invention at from 5 to 50 wt %, advantageously at from 10 to 30 wt % and more preferably at from 15 to 20 wt % in the reaction. Preferably, component C does not contain any hydroxyl groups in addition to the carboxyl groups. Hence polyhydroxy carboxylic acids are preferably not concerned. It may be particularly advantageous to use poly- or dicarboxylic acids which exclusively have carboxyl groups and/or anhydrides thereof as functional groups. It may similarly be possible to use for example, in a further variant, salts or esters of component C, for example the salt formed by the carboxylate and the ion of an alkaline earth metal. Preferably, free acid groups are present in the reaction. Examples of suitable polycarboxylic acids are $C_{3-12}$alkanepolycarboxylic acids or -dicarboxylic acids, for example malonic acid, succinic acid, glutaric acid, adipic acid or higher dicarboxylic acids, which may also be $C_{1-3}$alkyl substituted. Examples of suitable aromatic poly- or dicarboxylic acids are phthalic acid, isophthalic acid, terephthalic acid. Further possibilities include aliphatic unsaturated poly- or dicarboxylic acid, such as fumaric acid or maleic acid and keto-containing dicarboxylic acids, such as oxaloacetic acid.

It is preferable for component C to be used in the reaction as an at least partial, preferably complete solute in component B. Even polycarboxylic acids which are solid at the reaction temperature are thus simple to introduce into the reaction or to be more precise the reaction mixture.

For the purposes of the present invention, at least one Lewis base component, herein also referred to as component D, may be understood as meaning a compound capable of providing electron pairs, for example in accordance with the meaning of the term "Lewis base" in chemistry. Preferably, the free electron pair is in an organic compound, but can also be bound to a metal or to an organometallic compound.

The Lewis base is preferably used in an amount of from 0.05 to 1 wt % and more preferably 0.1 to 0.5 wt %.

In a preferred embodiment of the process according to the present invention, the Lewis base component is selected from the group consisting of N-methylimidazole, melamine, guanidine, cyanuric acid, dicyandiamide or their derivatives.

Ideally, the Lewis base is able to generate the formation of a carboxylate from the carboxylic acid, so that this carboxylate can quickly react with the diisocyanate component. The Lewis base likewise functions as a catalyst for the detachment of $CO_2$ in the reaction of the diisocyanate component with the dicarboxylic acid component. A synergistic effect may particularly advantageously result from the formation of the carboxylate and the detachment of $CO_2$ using the Lewis base, and so only one catalyst or accelerant is needed.

In a further embodiment of the process according to the present invention, the reaction takes place in the presence of at least one foam stabilizer E, and said stabilizer E preferably comprises a siloxane copolymer. This polysiloxane copolymer is preferably selected from the group comprising polyether-polysiloxane copolymers, such as polyether-polydimethylsiloxane copolymer.

The proportion of component E is in the range from 0 to 5 wt %, preferably in the range from 0 to 3 wt % and especially in the range from 0 to 1 wt %. When foam stabilizer component E is used, its proportion is preferably in the range from 0.1 to 5 wt %, more preferably in the range from 0.3 to 3 wt % and especially in the range from 0.5 to 1 wt %.

The total amounts of components A to E sum to 100 wt %. This means that the reaction mixture can but need not contain further components other than A to E. The quantitative recitations of components A to E are standardized with regard to their sum total.

The process for producing a polymer foam can be carried out at a starting temperature in the range from at least 15° C. to at most 100° C., more preferably from at least preferably 15° C. to at most 80° C., especially at a starting temperature from at least 25° C. to at most 75° C. and more preferably at a starting temperature from at least 30° C. to at most 70° C. The reaction of the abovementioned components can take place at atmospheric pressure. This reduces for example the energy requirements of producing the polymer foam. It is similarly possible to circumvent the disadvantageous effect of a higher temperature on the formation of a scorched core, and gas production/foam formation and viscosity increase are well matched to each other, as described above.

The reactor and the reaction mixture are controlled to the temperature at which the reaction is started. The temperature can rise in the course of the reaction. Typically, the receptacle in which the reaction takes place is not separately heated or cooled, and so the heat of reaction is removed to the environment via the receptacle walls or the air. Since the reaction is accelerated by the Lewis base component used in the process of the present invention in that the Lewis base acts as a catalyst, the process of the present invention provides complete and rapid further reaction between diisocyanate components and dicarboxylic acid components to form an amide component. But advantageously the reaction need not be carried out under the conditions of an elevated temperature, as described in EP 0 527 613 A2 for example.

In a further embodiment of the process according to the present invention, the reaction can be carried out with short-chain dicarboxylic acids and di- or polyisocyanates. This can make it possible to produce block copolymers for example.

In a preferred embodiment of the process according to the invention, the reaction to form the polymer foam starts after at least 3 to 90 seconds, especially after 5 to 70 seconds and most preferably after 5 to 40 seconds. The reaction starting is to be understood as meaning that components A, B, C and D react to form the corresponding product(s) after they have been brought into contact with one another. Advantageously, externally heated components or reactors are not needed.

In a further embodiment of the process according to the present invention, the density of the polymer foam is preferably in the range from 8 g/l to 200 g/l, more preferably in the range from 10 g/l to 70 g/l and especially in the range from 15 g/l to 45 g/l. This makes it advantageously possible to obtain a foam density which is very difficult to obtain with polyurethanes. But ideally diisocyanate components and thus likewise similar conditions in the production can be used.

The compound further provides a polymer foam deriving from polyisocyanates comprising at least 10 wt % of condensation products comprising polyimide groups and resulting from condensing at least one polyisocyanate with at least one polycarboxylic acid having at least 3 COOH groups per molecule or its anhydride, polyols or an isocyanate-functional prepolymer thereof and also polycarboxylic acids as monomers, comprising urethane, imide and amide groups in the polymer main chain and preferably having a foam density of 8 g/l to 200 g/l.

The present invention further provides for the use of polyisocyanates comprising at least 10 wt % of condensation products comprising polyimide groups and resulting from condensing at least one polyisocyanate with at least one polycarboxylic acid having at least 3 COOH groups per molecule or its anhydride, for production of polymer foams.

For the purposes of the present invention, a polyaddition product is a chemical reaction product where the reactants react with each or one another without the formation of low molecular weight by-products, as for example water or $CO_2$ in urethane formation for example. For the purposes of the present invention, a polycondensation product can be understood as meaning a product which, in the reaction of two reactants, provides at least one low molecular by-product, for example carbon dioxide in amide formation. Accordingly, a polyglycol component can combine with a diisocyanate component to form a polyaddition product and a dicarboxylic acid component with the diisocyanate component to form a carbamic anhydride with further reaction to form an amide compound, by $CO_2$ formation, can be understood as polycondensation reaction.

The present invention further provides for the use of the polymer foam of the present invention for thermal insulation or as engineering material.

For thermal insulation, the use preferably takes the form of being for production of refrigerating or freezing appliances, appliances for hot water preparation or storage or parts thereof, or for thermal insulation of buildings, vehicles or appliances.

In the above applications especially, the polymer foam of the present invention is used to form the thermal insulating layer in the devices or appliances, buildings or vehicles. The polymer foam of the present invention can also be used to form the entire housing or outer shells of appliances, buildings or vehicles.

As an engineering material, the polymer foam of the present invention is preferably used as core foam for producing sandwich composites. Sandwich composites of this type typically have a core of polymer foam and are paneled or sheathed with wood, metal or preferably a fiberglass-reinforced plastic. This sheathing or paneling plastic is freely choosable. Epoxy or polyester resins are frequently concerned.

Sandwich composites of this type are preferentially used in the automotive, shipbuilding, building construction or wind power industry.

For the purposes of the present invention, vehicles are air, land or water vehicles, especially airplanes, automobiles or ships.

A person skilled in the art will be aware of further uses for the polymer foams of the present invention.

The examples which follow will further elucidate the invention:

EXAMPLES

Molecular weights in the examples which follow were determined by gel permeation chromatography (GPC). Polymethyl methacrylate (PMMA) was used as standard. The solvent used was dimethylacetamide (DMAc). The NCO content was determined by IR spectroscopy.

The syntheses were carried out under nitrogen, unless otherwise stated.

Preparation of MDI-Imide

A 4 L four-neck flask equipped with dropping funnel, reflux condenser, internal thermometer and Teflon tube was initially charged with 100 g of 1,2,4,5-benzenetetracarboxylic dianhydride (0.64 mol) dissolved in 1500 ml of acetone, and 0.1 g of water was added. This was followed at 20° C. by the dropwise addition of 465 g of polymeric 4,4'-diphenylmethane diisocyanate (methylene diphenylene diisocyanate) having an average molar mass of 337 g/mol and a functionality of 2.5 (i.e., 2.5 isocyanate groups per molecule) (1.38 mol). The mixture was heated to 55° C. with stirring and refluxed at this temperature for 6 hours with further stirring. The mixture was then diluted with 1000 g of polymeric 4,4'-diphenylmethane diisocyanate and heated to 55° C. with stirring. The mixture was refluxed at 55° C. for six hours with stirring. Subsequently, the acetone was distilled off at atmospheric pressure over a period of one hour.

At the end of the distillation, the residue thus obtained was stripped with nitrogen at 70° C. and 200 mbar to obtain an MDI-imide having an isocyanate functionality of 27% (measured via IR)

$M_n$=3200 g/mol, $M_w$=4850 g/mol $M_w/M_n$=1.5

The MDI-imide thus obtained was used hereinbelow to produce the polymer foam in Example 1.

Production of Polymer Foams

The examples hereinbelow demonstrate the production and properties of polymer foams. The materials of the present invention were produced in the lab using a blender. Unless otherwise stated, the reaction was carried out at ambient temperature (22° C.) as starting temperature, i.e., the components were reacted at ambient temperature in a non-temperature-controlled reactor or receptacle, and the heat of reaction was removed to the environment without further auxiliaries.

The following polymer foams were produced in the lab in accordance with table 1. The room temperature solid dicarboxylic acid components were first melted and dissolved in the polyol component. The diol-dicarboxylic acid mixture was then reacted with a polyisocyanate as per Example 1 with an MDI-imide. Foam cubes having a volume of 20 l were produced and subsequently subjected to mechanical testing. The composition of the starting substances and also the results of the testing are reported in table 1 on the one hand and tables 2 and 3 on the other.

In addition to the inventive polymer foam of Example 1, two hitherto customary polymer foams were produced from known compositions as Comparative Examples 1 and 2. This required the use of mixtures of multiple polyols and mixtures of multiple catalysts to arrive at usable polymer foams.

Such a multiplicity of polyol and catalyst components are no longer needed in the process of the present invention. Polymer foams having outstanding properties were obtained with just a single polyol component and with just a single catalyst, as is apparent from the tables hereinbelow.

TABLE 1

|  | Ex. 1 | Comp. 1 | Comp. 2 |
| --- | --- | --- | --- |
| acid 1 | 18.1 |  |  |
| acid 2 |  | 0.6 |  |
| polyol 1 | 18.1 |  | 7.5 |
| polyol 2 |  | 18.3 |  |
| polyol 3 |  | 5.7 |  |
| polyol 4 |  | 3 |  |
| polyol 5 |  |  | 22.9 |
| polyol 6 |  |  | 2.2 |
| polyol 7 |  |  | 6.7 |
| iso 1 |  |  | 58.3 |
| iso 2 |  | 57.6 |  |
| MDI-imide | 62.9 |  |  |
| stabilizer 1 | 0.7 |  |  |
| stabilizer 2 |  | 0.8 |  |
| stabilizer 3 |  |  | 0.2 |
| stabilizer 4 |  |  | 0.5 |
| cat 1 | 0.2 |  | 0.1 |
| cat 2 |  | 0.9 |  |
| cat 3 |  | 0.5 |  |
| cat 4 |  |  | 0.2 |
| blowing agent 1 |  | 3.0 |  |
| blowing agent 2 |  |  | 1.5 |
| additive |  | 9.5 |  |

The meanings are:
acid 1: pentanedioic acid M=132 g/mol
acid 2: 85 parts of methanoic acid in 15 parts of water
polyol 1: polypropylene glycol with average molecular weight (MW) 420 g/mol
polyol 2: polyester diol (phthalic acid-oleic acid polyester diol) with average molar mass 600 g/l
polyol 3: polyesterol (phthalic acid-oleic acid polyester diol) with average molar mass 510 g/l and average functionality 2.2
polyol 4: polyethylene glycol with average molecular weight (MW) 600 g/mol
polyol 5: polypropylene glycol with average molecular weight (MW) 500 g/mol
polyol 6: polypropylene glycol with average molecular weight (MW) 1040 g/mol
polyol 7: polypropylene glycol with average molecular weight (MW) 1070 g/mol
additive: tri-2-chloroisopropyl phosphate
blowing agent 1: n-pentane
blowing agent 2: water
iso 1: polymeric methylenediphenylene diisocyanate having an average molar mass of 337 g/mol and a functionality of 2.7
iso 2: polymeric methylenediphenylene diisocyanate having an average molar mass of 362 g/mol and a functionality of 2.8
MDI-imide: polyimide based on benzenetetracarboxylic dianhydride and polymeric methylenediphenylene diisocyanate having a free isocyanate content of 27%, prepared as described above
stabilizer 1: polyether-polysiloxane copolymer
stabilizer 2: polyether-polydimethylsiloxane
stabilizer 3: silicone-glycol copolymer stabilizer 4: polyether-polydimethylsiloxane copolymer
cat 1: 1-methylimidazole
cat 2: 30 parts of a bis(2-dimethylaminoethyl)ether in dipropylene glycol
cat 3: 40 parts of potassium formate, 6 parts of water, 54 parts of monoethylene glycol
cat 4: N,N-dimethylcyclohexylamine Example 1

Inventive 100 parts of pentanedioic acid and 100 parts of polypropylene glycol having an MW of 420 g/mol were heated together at above 100° C. in a heating cabinet until all the pentanedioic acid had melted. This acid-polyol mixture was then homogenized and cooled down to 60° C. before it was admixed with 4 parts of polyether-polysiloxane copolymer and 0.8 part of 1-methylimidazole. Addition of 347 parts of MDI-imide, prepared as described above on the basis of benzenetetracarboxylic dianhydride and polymeric methylenediphenylene diisocyanate is followed by vigorous commixing with the lab stirrer for 7 s. Directly thereafter, the system was poured into a cube mold, where it underwent expansive foaming. Test specimens were taken from the polyamide-polyurethane foam thus produced and subjected to mechanical/thermal tests.

Comparator to Example 1

The components as per table 1 in the Comp. 1 column with the exception of iso 2 were weighed in together pro rata for an overall batch size of 350 parts and then homogenized. This mixture was vigorously admixed with 490 parts of iso 2 using a lab stirrer and then poured into the cube mold. The rigid foam rose in the mold and was left therein until fully cured.

Comparator to Example 2

The components as per table 1 in the Comp. 2 column with the exception of iso 1 were weighed in together pro rata for an overall batch size of 400 parts and then homogenized. This mixture was vigorously admixed with 680 parts of iso 1 using a lab stirrer and then poured into the cube mold. The foam rose in the mold and was left therein until fully cured.

Properties of Products Obtained

TABLE 2

|  | Ex. 1 | Comp. 1 | Comp. 2 |
| --- | --- | --- | --- |
| density | 27 | 48 | 39 |
| compressive strength | 0.19 | 0.12 | 0.09 |
| relative deformation | 6 | 10 | 12 | density: core density [kg/m$^3$]
compressive strength in N/mm$^2$ to DIN 53421/DIN EN ISO 604
relative deformation [%] to DIN 53421/DIN EN ISO 604

Table 2 reveals that the inventive examples featuring foams in the same density range have a higher compressive strength. The relative deformation values are likewise better for the inventive foams.

TABLE 3

|  | Ex. 1 | Comp. 1 | Comp. 2 |
| --- | --- | --- | --- |
| density | 27 | 48 | 39 |
| TGA | 290 | 214 | 185 | density: core density [kg/m$^3$]
TGA: thermogravimetric analysis [° C.] to DIN EN ISO 11358, evaluation on basis of absolute value at 95% of starting sample mass On being subjected to thermogravimetric analysis, the inventive foam proves to be thermally more stable than rigid foams of similar/comparable density.

The invention claimed is:
1. A process for producing a polymer foam, comprising:
i) preparing a mixture of polyisocyanate components, comprising:
10 to 100 wt % of a condensation product of at least one polyisocyanate component with at least one polycarboxylic acid having at least 3 COOH groups per molecule or its anhydride, the condensation product comprising polyimide groups;
ii) reacting the mixture of polyisocyanate components with a polyol component and a polycarboxylic acid having two or more carboxyl groups in the presence of a Lewis base to obtain a polymer having a main chain comprising urethane, imide and amide groups;
wherein
carbon dioxide is released during the reaction ii),
a foam stabilizer is optionally included in the reaction ii), and
a content in weight % of the polyisocyanate mixture of i) in the reaction mixture ii) is from 35 to 65 wt %,
a content of the polyol component in the reaction mixture ii) is from 5 to 50 wt %,
a content of the polycarboxylic acid having two or more carboxyl groups in the reaction mixture ii) is from 1 to 59 wt %,
a content of the Lewis Base in the reaction mixture ii) is from 0.01 to 3 wt %,
a content of the foam stabilizer in the reaction mixture ii) is from 0 to 5 wt %, and a total of the wt % content values is 100%,
and wherein
the at least one polycarboxylic acid having at least 3 COOH groups per molecule or its anhydride is selected from the group consisting of 1,2,3-benzenetricarboxylic acid, 1,2,3-benzenetricarboxylic dianhydride, 1,3,5-benzenetricarboxylic acid (trimesic acid), 1,2,4-benzenetricarboxylic acid (trimellitic acid), trimellitic anhydride, 1,2,4,5-benzenetetracarboxylic acid (pyromellitic acid), 1,2,4,5-benzenetetracarboxylic dianhydride (pyromellitic dianhydride), 3,3',4,4"-benzophenonetetracarboxylic acid, 3,3',4,4"-benzophenonetetracarboxylic dianhydride, benzenehexacarboxylic acid (mellitic acid), anhydrides of mellitic acid, mellophanic acid, mellophanic anhydride, 1,2,3,4-benzenetetracarboxylic acid, 1,2,3,4-benzenetetracarboxylic dianhydride, 3,3,4,4-biphenyltetracarboxylic acid, 3,3,4,4-biphenyltetracarboxylic dianhydride, 2,2,3,3-biphenyltetracarboxylic acid, 2,2,3,3-biphenyltetracarboxylic dianhydride, 1,4,5,8-naphthalenetetracarboxylic acid, 1,4,5,8-naphthalenetetracarboxylic dianhydride, 1,2,4,5-naphthalenetetracarboxylic acid, 1,2,4,5- naphthalenetetracarboxylic dianhydride, 2,3,6,7-naphthalenetetracarboxylic acid, 2,3,6,7-naphthalenetetracarboxylic dianhydride, 1,4,5,8-decahydronaphthalenetetracarboxylic acid, 1,4,5,8-decahydronaphthalenetetracarboxylic dianhydride, 4,8-dimethyl-1,2,3,5,6,7-hexahydronaphthalene-1,2,5,6-tetracarboxylic acid, 4,8-dimethyl-1,2,3,5,6,7-hexahydronaphthalene-1,2,5,6-tetracarboxylic dianhydride, 2,6-dichloronaphthalene-1,4,5,8-tetracarboxylic acid, 2,6-dichloronaphthalene-1,4,5,8-tetracarboxylic dianhydride, 2,7-dichloronaphthalene-1,4,5,8-tetracarboxylic acid, 2,7-dichloronaphthalene-1,4,5,8-tetracarboxylic dianhydride, 2,3,6,7-tetrachloronaphthalene-1,4,5,8-tetracarboxylic acid, 2,3,6,7-tetrachloronaphthalene-1,4,5,8-tetracarboxylic dianhydride, 1,3,9,10-phenanethrenetetracarboxylic acid, 1,3,9,10-phenanthrenetetracarboxylic dianhydride, 3,4,9,10-perylenetetracarboxylic acid, 3,4,9,10-perylenetetracarboxylic dianhydride, bis(2,3-dicarboxyphenyl)methane, bis(2,3-dicarboxyphenyl) methane dianhydride, bis(3,4-dicarboxyphenyl) methane, bis(2,3-dicarboxyphenyl)methane dianhydride, bis(3,4-dicarboxyphenyl)methane, bis(3,4-dicarboxyphenyl)methane dianhydride, 1,1-bis(2,3-dicarboxyphenyl)methane, 1,1-bis(2,3-dicarboxyphenyl)ethane dianhydride, 1,1-bis(3,4-dicarboxyphenyl)ethane, 1,1-bis(3,4-dicarboxyphenyl)ethane dianhydride, 1,1-bis(3,4-dicarboxyphenyl)ethane, 1,1-bis(3,4-dicarboxyphenyl)ethane dianhydride, 2,2-bis(2,3-dicarboxyphenyl)propane, 2,2-bis(2,3-dicarboxyphenyl)propane dianhydride, 2,3-bis(3,4-dicarboxyphenyl)propane, 2,3-bis(3,4-dicarboxyphenyl)propane dianhydride, bis(3,4-carboxyphenyl) sulfone, bis(3,4-carboxyphenyl) sulfone dianhydride, bis(3,4-carboxyphenyl) ether, bis(3,4-carboxyphenyl) ether dianhydride, ethylenetetracarboxylic acid, ethylenetetracarboxylic dianhydride, 1,2,3,4-butanetetracarboxylic acid, 1,2,3,4-butanetetracarboxylic dianhydride, 1,2,3,4-cyclopentanetetracarboxylic acid, 1,2,3,4-cyclopentanetetracarboxylic dianhydride, 2,3,4,5-pyrrolidinetetracarboxylic acid, 2,3,4,5-pyrrolidinetetracarboxylic dianhydride, 2,3,5,6-pyrazinetetracarboxylic acid, 2,3,5,6-pyrazinetetracarboxylic dianhydride, 2,3,4,5-thiophenetetracarboxylic acid, 2,3,4,5-thiophenetetracarboxylic dianhydride and derivatives thereof.

2. The process according to claim 1 wherein an average molecular weight of the polyol is in the range from 200 g/mol to 6000 g/mol.

3. The process according to claim 1 wherein the polymer foam is a rigid polymer foam.

4. The process according to claim 1 wherein an OH number of the polyol is from 10 mg KOH/g to 1000 mg KOH/g.

5. The process according to claim 1 wherein a foam density of the polymer foam is from 8 g/l to 200 g/l.

6. The process according to claim 1 wherein the Lewis base is at least one selected from the group consisting of N-methylimidazole, a derivative of N-methylimidazole, melamine, a derivative of melamine, guanidine, a derivative of guanidine, cyanuric acid, a derivative of cyanuric acid, dicyandiamide and a derivative of dicyandiamide.

7. The process according to claim 1 wherein the reaction (ii) further comprises a foam stabilizer which comprises a siloxane copolymer.

8. The process according to claim 1 wherein the polyol comprises a polyether polyol or a polyester polyol.

9. The process according to claim 1 wherein the polycarboxylic acid having two or more carboxyl groups is a solute in the polyol.

\* \* \* \* \*